United States Patent [19]

Rhodes et al.

[11] Patent Number: 5,016,418

[45] Date of Patent: May 21, 1991

[54] SYNCHRONOUSLY DEPLOYABLE DOUBLE FOLD BEAM AND PLANAR TRUSS STRUCTURE

[75] Inventors: Marvin D. Rhodes, Yorktown, Va.; John M. Hedgepeth, Santa Barbara, Calif.

[73] Assignee: The United States of America as represented by the Administrator of the National Aeronautics and Space Administration, Washington, D.C.

[21] Appl. No.: 899,683

[22] Filed: Aug. 22, 1986

[51] Int. Cl.[5] .............................................. E04H 12/18
[52] U.S. Cl. ........................................ 52/646; 403/72
[58] Field of Search ................. 52/108, 648, 646, 109; 403/72, 170, 172, 176

[56] References Cited

U.S. PATENT DOCUMENTS

| | | | |
|---|---|---|---|
| 4,475,323 | 10/1984 | Schwartzberg | 52/646 |
| 4,482,900 | 11/1984 | Bilek | 52/646 |
| 4,578,920 | 4/1986 | Bush | 403/170 |
| 4,667,451 | 5/1987 | Onoda | 52/646 |

FOREIGN PATENT DOCUMENTS 2434 6/1985 World Int. Prop. O. ............ 52/108

OTHER PUBLICATIONS

Deployable Structures for Large Space Platform Systems pp. 1-39 ©NASA Aug. 1982.

*Primary Examiner*—Henry E. Raduazo
*Attorney, Agent, or Firm*—George F. Helfrich; Harold W. Adams; John R. Manning

[57] ABSTRACT

A deployable structure that synchronously deploys in both length and width is disclosed which is suitable for use as a structural component for orbiting space stations or large satellites. The structure is designed with maximum packing efficiency so that large structures may be collapsed and transported in the cargo bay of the Space Shuttle. The synchronous deployment feature allows the structure to be easily deployed in space without a complex deployment mechanism. The structure is made up of interconnected structural units, each generally in the shape of a parallelepiped. The structural units are constructed of structural members connected with hinged and fixed connections at connection nodes in each corner of the parallelepiped. Diagonal members along each face of the parallelepiped provide structural rigidity and are equipped with mid-length, self-locking hinges to allow the structure to collapse. The structure is designed so that all hinged connections may be made with simple clevis-type hinges requiring only a single degree of freedom, and each hinge pin is located along the centerline of its structural member for high strength and stiffness.

6 Claims, 4 Drawing Sheets

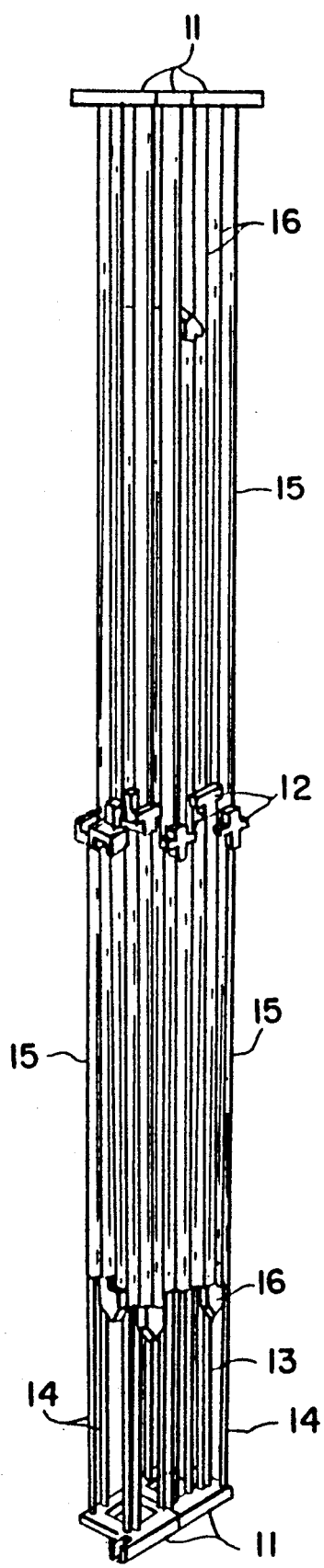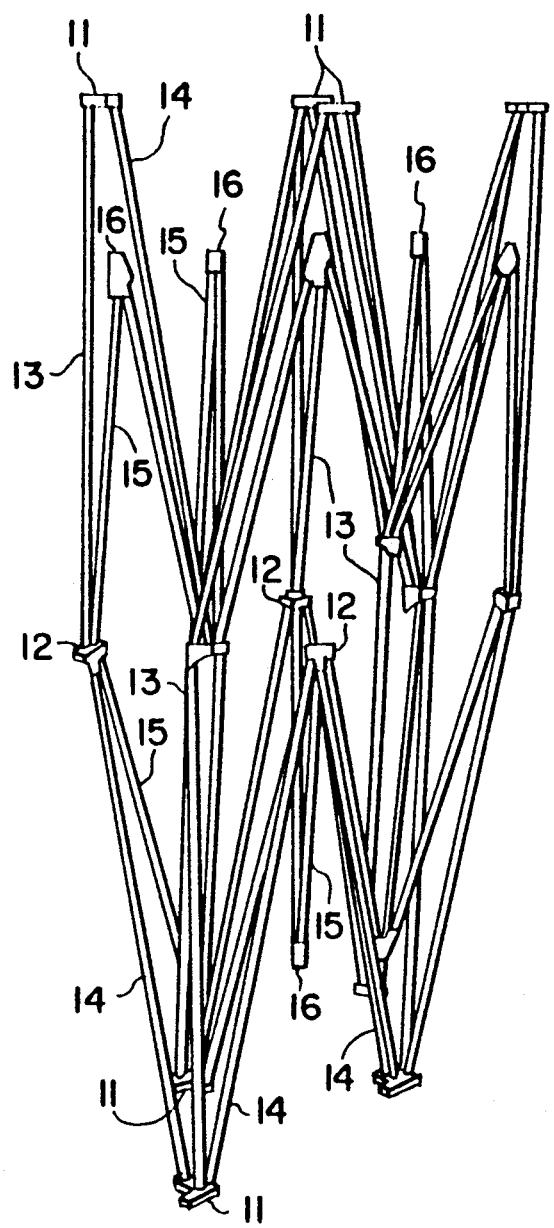
FIG. 3
FIG. 4

SYNCHRONOUSLY DEPLOYABLE DOUBLE FOLD BEAM AND PLANAR TRUSS STRUCTURE

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

TECHNICAL FIELD OF THE INVENTION

This invention relates to the field of foldable beam structures, and more particularly to synchronously deployable structures for use in space applications.

BACKGROUND OF THE INVENTION

Deployable beam structures are required for many applications aboard the proposed space station as well as uses in other free flying satellites. These structures must package efficiently for launch into orbit and deploy reliably upon command. A number of deployable beam concepts have been proposed and compared. (see Greenberg, H. S.: *Development of Deployable Structures for Large Space Platforms*. NASA CR-170689, December 1982, and Cox, R. G. and Nelson, R. A.: *Development of Deployable Structures for Large Space Platforms*. NASA CR-176090, December 1982.) Most of these proposed concepts require sophisticated mechanisms to deploy the beam or platform in space. The deployer system for these structures may have a mass that exceeds the mass of the structure, and after the structure is deployed the deployer serves no useful function. Deployable structures also frequently have special joints and hinge mechanisms that are required to insure deployment, and many of these mechanisms are complicated because they must lock in place when the structure, or portions thereof, is fully deployed. To reduce the joint complexity, many of these concepts are single-fold configurations in that the structure only folds in planar sections. While this reduces complexity, it also increases the stored volume, thus reducing the packaging efficiency. The combined effects of the deployment mechanisms, joint complexity and packaging efficiency frequently compromises the deployment reliability and the structural performance to such an extent that the deployable structure may be unsuitable for many applications. The mechanical complexity of the deployer also makes the system very costly to design and develop.

Other foldable structures, of which there is a great abundance, were not designed with the requirements of space application in mind. Structures used for folding tents or shelters on earth are generally inappropriate for use in space, due to inadequate packaging and deployment methods. Existing earthbound structures were not designed to make up structural beams 400 feet in length, as might be required for the construction of a space station.

It is therefore an object of the present invention to provide a foldable beam and/or planar truss structure suitable for space application which is synchronously deployable.

It is a further object of the present invention to provide a synchronously deployable structure which operates without the use of a complicated deployment mechanism.

Another object of the present invention is to provide a synchronously deployable structure which utilizes simple, single degree-of-freedom connection points.

Another object of the present invention is to provide a space structure which collapses into an efficient and dense configuration for transportation in the Space Shuttle cargo bay.

BRIEF SUMMARY OF THE INVENTION

According to the present invention, the foregoing and additional objects are attained by providing a synchronously deployable, self-supporting truss structure made up of a plurality of like structural units. Each structural unit is generally in the shape of a parallelepiped, with rigid structural members forming the boundaries of the parallelepiped and being interconnected by fixed and hinged connections at connection nodes located at each corner of the parallelepiped. The structural unit is made self supporting by the addition of folding diagonal structural members on each face of the parallelepiped. The orientation of the diagonal members alternates approximately 90° from node to node, and each diagonal member is equipped with a self-locking midlength hinge to allow the structural unit to fold and self-support.

The truss structure is formed by joining the structural units in such a way that there are no duplicated faces; when combined into a larger structure, adjoining structural units share the structural members on their common face. The structure is designed so that all hinged connections may be made with simple clevis type hinges requiring only a single degree of freedom, and all hinge pins may be located along the centerline of the structural members for high strength and stiffness.

BRIEF DESCRIPTION OF THE DRAWINGS

FIG. 3 is a perspective view of the structure shown in FIG. 2 in a collapsed state;

FIG. 4 is a perspective view of the structure shown in FIG. 2 in the initial stages of deployment.

DETAILED DESCRIPTION OF THE INVENTION

Figure 1:
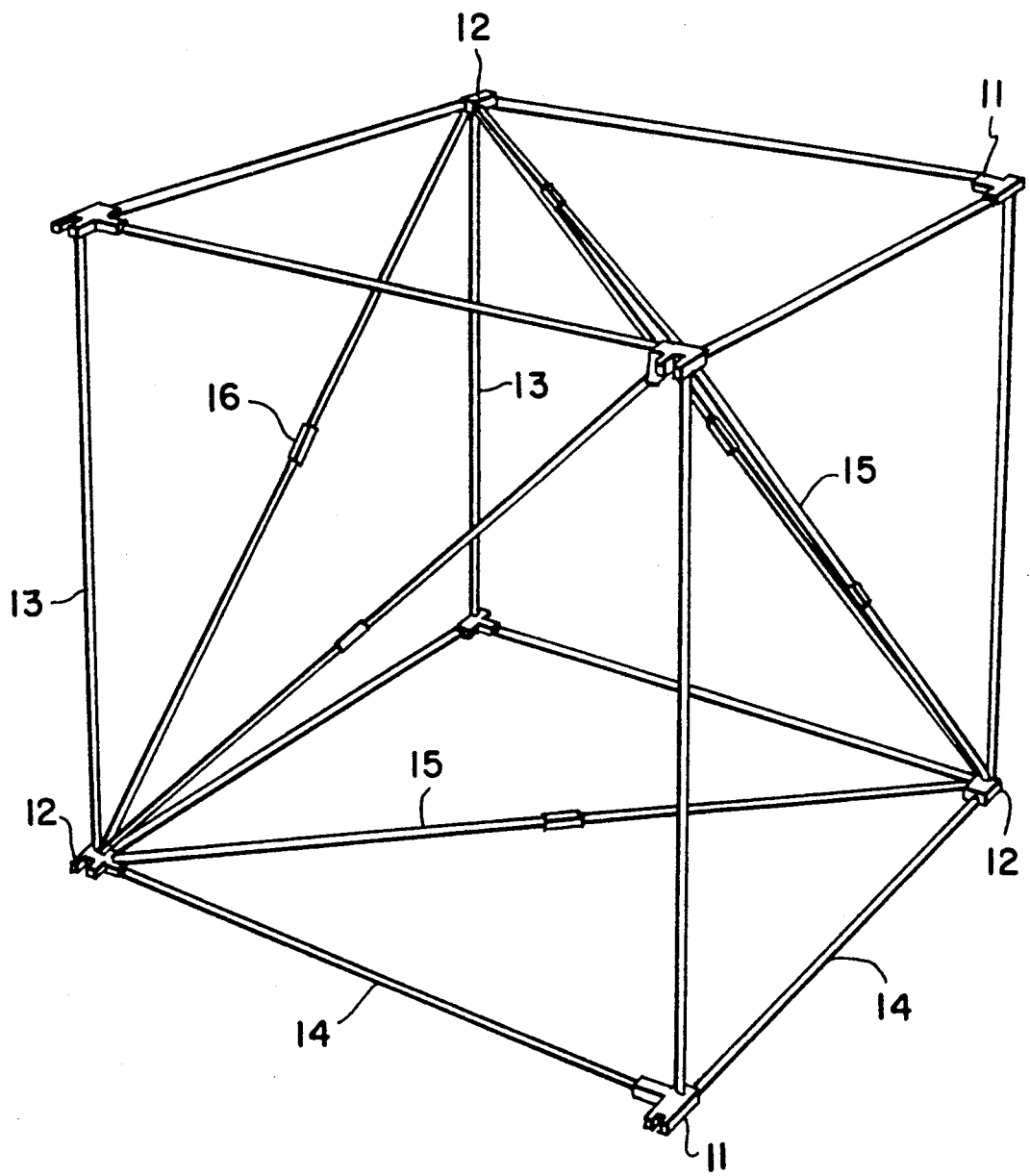
FIG 1 is a perspective view of a single structural unit according to the present invention.

Referring to FIG. 1, the fundamental structural unit of the present invention generally comprises eighteen structural members and eight connection nodes. Only two types of connection nodes are required: a type-one node 11 being capable of making three hinged connections and one fixed connection, and a type-two node 12 being capable of making eight hinged connections and one fixed connection. The structure is designed such that only simple clevis hinges utilizing only one degree of freedom are required for all hinged connections. In addition all hinge pins may be located in line with the longitudinal centerline of the structural members, eliminating unnecessary bending moments and thereby increasing the overall strength and stiffness of the structure.

Rigid vertical structural members 13, hereinafter referred to as verticals, are located at the corners of the rectangular cross section. The verticals each connect a type-one node 11 to a type-two 12 node by means of rigid connections. Rigid vertical structural members 14, hereinafter referred to as horizontals, join the verticals together at the connection nodes by means of hinged connections. The connection nodes and verticals are arranged such that a type-one node 11 is connected directly to a type-two node 12 by a horizontal or vertical. Diagonal structural members 15, hereinafter diagonals, are located diagonally across each face of the structural unit so that each diagonal connects two type-two nodes 12 by means of hinged connections. The diagonals 15 provide structural rigidity for the deployed structure shown in FIG. 2, which figure illustrates the orientation of the diagonals.

Figure 2:
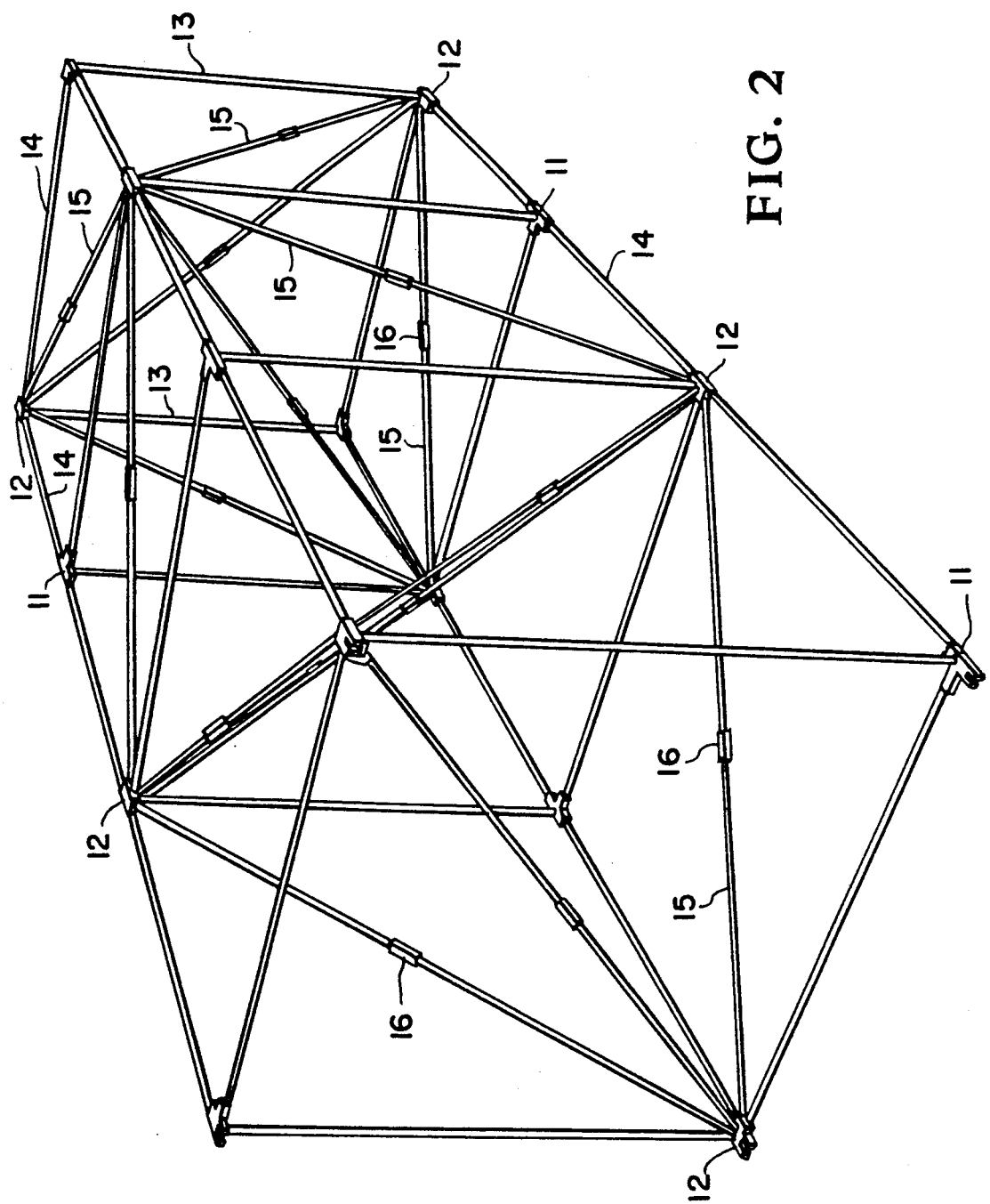
FIG. 2 is a perspective view of a fully deployed structure composed of three of the structural units shown in FIG. 1.
Figure 5:
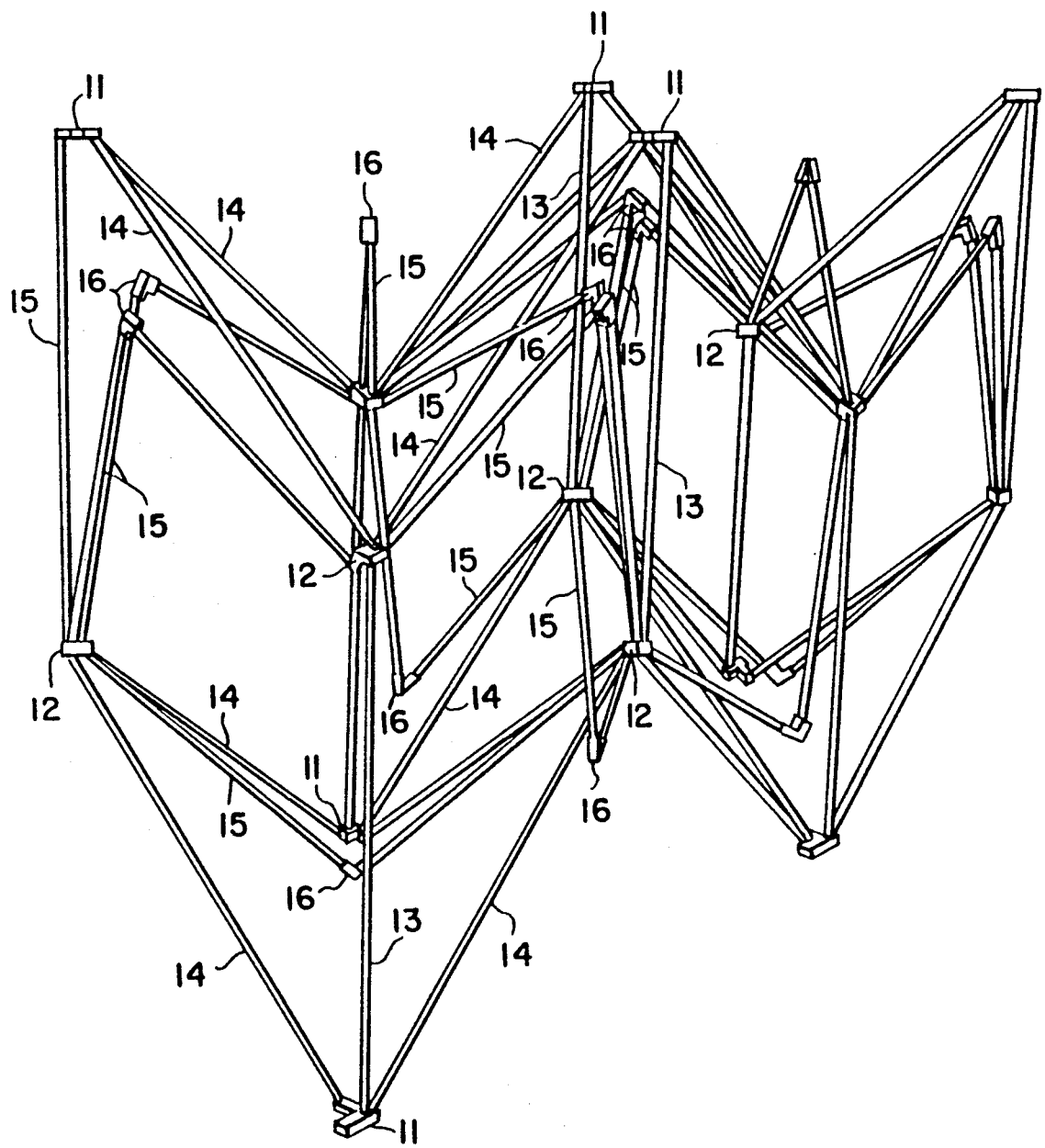
FIG. 5 is a perspective view of the structure shown in FIG. 2 just prior to full deployment.

To allow the structure to deploy, each diagonal 15 is equipped with a self-locking, mid-length hinge 16. The diagonals are folded at the mid-length hinge when the structure is in the fully collapsed condition, as shown in FIG. 3. As the structure is deployed, shown progressively in FIGS. 4 and 5, the mid-length hinge 16 opens, thus permitting the diagonals 15 and horizontals 14 to rotate about their hinges. The deployment of all members occurs in a synchronous manner so that the structure simultaneously deploys in length and width. This synchronization is inherent in the design as shown in the attached drawings of the preferred embodiment, and in fact the structure described herein is incapable of being deployed in a sequential manner. No additional members or erecting connections are required, and a large multibay truss may be deployed by a single actuator. When the structure reaches the fully deployed condition, as illustrated in FIG. 2, the mid-length hinges 16 self lock in order that the structure may be rigid and self-supporting. An alternative embodiment of the present invention would be the use of telescoping diagonals employing a self-locking feature. Telescoping diagonals would connect nodes in corners opposite to those shown connected by the folding diagonals 15 in FIGS. 1 and 2, and therefore would elongate when the structure was collapsed. A combination of folding and telescoping diagonals could be used in different faces or structural units of the same structure.

Larger structures are created by adding members to existing structural units to create new, attached structural units. There are no duplicated faces; when combined into a larger structure, adjoining structural units share the members on their common face.

The basic structural unit, FIG. 1, and structure, FIG. 2, as described above, are expandable in two dimensions due to the specific node configurations described. The expandability of the structural unit may be increased by adding additional hinged and fixed connection points positioned 180° opposite from each existing hinged connection point on each connection node of both types.

Packaging efficiency and density in the collapsed condition are important considerations for this structure, in order to minimize the space necessary for transportation into orbit. Packaging efficiency may be increased by optimizing the location of the hinge point along the longitudinal axis of the structural member for particular member shapes. Packaging efficiency may be further increased by members having noncircular cross-sections. The use of I and channel sections for the verticals 13 and horizontals 14 respectively would permit the diagonals to be nested within the open section of the other members thereby increasing the density of the package.

The present invention can be used not only to deploy straight beams and flat planar trusses, but has application as well to curved beams and contoured planar platforms which are required for large antenna and solar concentrator structures. Curved beams or contoured platforms are made by utilizing diagonals of different lengths in different structural units. The diagonal length controls the final deployed angle between the verticals and horizontals. The diagonal length thus establishes the contour of the structure without changing the hinge angle at the connection nodes.

Although specific embodiments of the invention have been described herein, they are to be considered as exemplary of the novel features thereof and are not exhaustive. There are obviously many variations and modifications of these specific examples that will be readily apparent to those skilled in the art in light of the above teachings without departing from the spirit or scope of the appended claims. It is, therefore, to be understood that the invention may be practiced otherwise than as specifically described.

What is claimed as new and desired to be secured by Letters Patent of the United States is:

1. A synchronously deployable structural unit comprising:
    eight connection nodes, arranged so as to form the corners of a parallelepiped, each connection node being provided with means for one rigid connection and three hinged connections located in a plane perpendicular to the axes of a rigidly connected member and arranged at 90°—90° C. intervals around the rigid connection;
    four rigid structural members, each rigidly connecting two separate connection nodes; and
    eight rigid structural members, each connecting two connection nodes by means of hinged connections.

2. A structural unit according to claim 1 which is interconnected with a plurality of other structural units according to claim 1, so that the connection nodes and rigid structural members on adjoining sides of adjoining structural units are shared by said adjoining structural units.

3. The structural unit of claim 1 wherein four of the eight connection nodes are further provided with means for five additional hinged connections, each additional hinged connection point being located between two of the connection points recited in claim 1 and in the plane formed by the two connection points between which it is located, for a total capability of up to eight hinged connections and one fixed connection on each of said four nodes, and each eight hinge connection node being located so that it is not adjacent to another eight hinge connection node.

4. The structural unit of claim 3 further comprising five diagonal folding structural members the ends of each of which are not a fixed distance apart, each diagonal folding structural member connecting two of the eight hinge connection nodes utilizing directly opposed connection points.

5. The structural unit of claim 4 wherein each of the five diagonal structural members is equipped with a lockable hinge, whereby the structural unit is made self-supporting.

6. A structural unit according to claim 5 which is interconnected with a plurality of other structural units according to claim 5 so that the connection nodes, rigid structural members and diagonal folding structural members on adjoining sides of adjoining structural units are shared by said adjoining structural units.

* * * * *